US009751445B1

(12) United States Patent
Arul et al.

(10) Patent No.: US 9,751,445 B1
(45) Date of Patent: Sep. 5, 2017

(54) FRONT TOWER STRUCTURE FOR A MINING VEHICLE

(71) Applicant: Caterpillar Inc., Peoria, IL (US)

(72) Inventors: Samuel J. Arul, Champaign, IL (US); Steven J. Fujan, Lincoln, NE (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/160,005

(22) Filed: May 20, 2016

(51) Int. Cl.
*B60P 1/28* (2006.01)
*B62D 21/09* (2006.01)
*B62D 33/02* (2006.01)

(52) U.S. Cl.
CPC .............. *B60P 1/286* (2013.01); *B62D 21/09* (2013.01); *B62D 33/0222* (2013.01); *B60Y 2200/41* (2013.01)

(58) Field of Classification Search
CPC ...... B62D 21/09; B62D 33/0222; B60R 1/286
USPC ..................................... 296/183.2; 298/22 R
See application file for complete search history.

(56) References Cited

U.S. PATENT DOCUMENTS

| 6,481,785 | B1 | 11/2002 | Coleman et al. |
| 6,592,172 | B2 | 7/2003 | Fujan et al. |
| 8,820,844 | B2 | 9/2014 | Moon et al. |
| 2010/0013267 | A1 | 1/2010 | Rogers et al. |
| 2014/0015279 | A1 | 1/2014 | De Paula e Silva et al. |
| 2014/0124337 | A1 | 5/2014 | Murphy |
| 2015/0001910 | A1* | 1/2015 | Natarajan ............... B60P 1/286 298/1 H |
| 2015/0165957 | A1* | 6/2015 | Sarangapani ........... B60P 1/286 296/183.2 |
| 2015/0239385 | A1* | 8/2015 | Kitaguchi ............... B60P 1/286 296/183.2 |
| 2016/0355117 | A1* | 12/2016 | Wang ....................... B60P 1/04 |

FOREIGN PATENT DOCUMENTS

WO 2015045152 2/2015

* cited by examiner

*Primary Examiner* — Jason S Morrow

(57) ABSTRACT

A front tower on a truck body for use with a mining vehicle. The truck body includes a truck bed including a canopy and a front exterior wall. The front exterior wall includes at least one front tower. The front tower includes two longitudinal plates spanning the front exterior wall, at least one gusset plate transverse and connected to the longitudinal plates, and a landing plate transverse and connected to the longitudinal plates. The landing plates are configured to transfer load stress from the bed to a frame of a mining vehicle.

20 Claims, 3 Drawing Sheets

FRONT TOWER STRUCTURE FOR A MINING VEHICLE

TECHNICAL FIELD

The present disclosure relates to mining vehicles, and more specifically, to truck bodies for off-road mining dump trucks.

BACKGROUND

Large mining dump trucks, or mining vehicles, are used around the world to haul material excavated by a mining machine, such as a dragline machine, rope shovel and the like. In surface mining, for example, these mining dump trucks repeatedly travel a prescribed course that involves receiving a load from the excavating machine, traveling to a location to dump the received load, and returning to the excavating machine for another load. Many trucks, one after the other, are commonly used to haul the material away in a continuous manner.

These mining vehicles are constructed to carry a maximum load which includes the weight of the truck body plus the weight of the mined material in the truck body. The standard truck body is fabricated of plate steel walls supported by a series of interconnected large, vertical and horizontal structural beams to carry the weight of the mined material and withstand the impacts associated with receiving the mined material from the excavating machine. These standard truck bodies are designed with a hauling capacity of 136 to 363 metric tons. The heavy weight of the truck body limits the load of mined material the truck can transport.

The repeated impact on the truck body from loading and dumping through the operational cycles and truck body's oscillations due to adverse haul roads causes high forces and develops stress concentrations on the truck body and frame. Stress concentrations can reduce the fatigue life of the truck body and frame. Front towers on the front of the truck body can be used to transfer and distribute some of the forces from the truck body to the frame of the truck. U.S. Patent Application Publication No. 2014/0015279 discloses front towers in FIG. 6.

Front towers are usually made using a series of vertical and horizontal interconnected metal plates to provide structural support for front side of the truck body to withstand forces induced by adverse haul road and the repeated impacts from loading. If the front towers are not strong enough, the truck body can be damaged. Specifically, the front towers and structural plates connected to the front towers can buckle and crack off the truck bed. This can impact the structural integrity of the truck body. In addition, if the front towers are not providing enough support, the life of the truck body can be significantly reduced because the stress induced by adverse haul road and from impact stress being wholly or mostly absorbed by the truck body. Furthermore, absence of these front towers or lack of contact between front towers and the mining truck's frame can reduce the fatigue life of the mining truck's frame.

The front towers of the present disclosure solve one or more of the problems set forth above.

SUMMARY OF THE INVENTION

In one aspect, the present disclosure is directed to a truck body for a mining vehicle. The truck body includes a canopy and a front exterior wall with at least one front tower. The front tower includes two or more longitudinal plates spanning the front exterior wall, at least one gusset plate transverse and connected to the longitudinal plates, and a landing plate transverse and connected to the longitudinal plates. The landing plates are configured to transfer load stress from the bed to a frame of a mining vehicle.

The longitudinal plates can be substantially parallel. The front tower can include two or more gusset plates. The front tower can be welded or bolted to the front exterior wall. The front tower can span the front exterior wall from a base of the front exterior wall.

In one embodiment, the front tower is connected to the canopy of the truck body. The front tower can be connected to the canopy of the bed with canopy connecting plates.

The landing plates can be connected to the longitudinal plates with landing connecting plates. The landing connecting plates can include support plates.

In another aspect, the present disclosure is directed a front tower for use on a mining vehicle. The front tower can include two or more longitudinal plates configured to span a front exterior wall of a mining vehicle body, at least one gusset plate transverse and connected to the longitudinal plates, and a landing plate transverse and connected to the longitudinal plates. The landing plates are configured to transfer load stress from a truck body to a chassis of the mining vehicle.

In yet another aspect, the present disclosure is directed to a mining truck. The mining truck may include a truck frame and a truck body including a front exterior wall and a canopy. The front exterior wall includes at least one front tower configured to transfer load stress from the truck body to the truck frame. The front tower includes two or more longitudinal plates spanning the front exterior wall, at least one gusset plate transverse to the longitudinal plates; and a landing plate transverse to the longitudinal plates.

DETAILED DESCRIPTION

The present disclosure is directed to improved front towers for truck bodies on mining vehicles, for example, mining dump trucks. The improved front towers increase the fatigue life of the truck body. The front towers of the present disclosure have reduced weight. In addition, they front towers are strong enough to transfer the load stress from the truck body to the truck frame.

Figure 1:
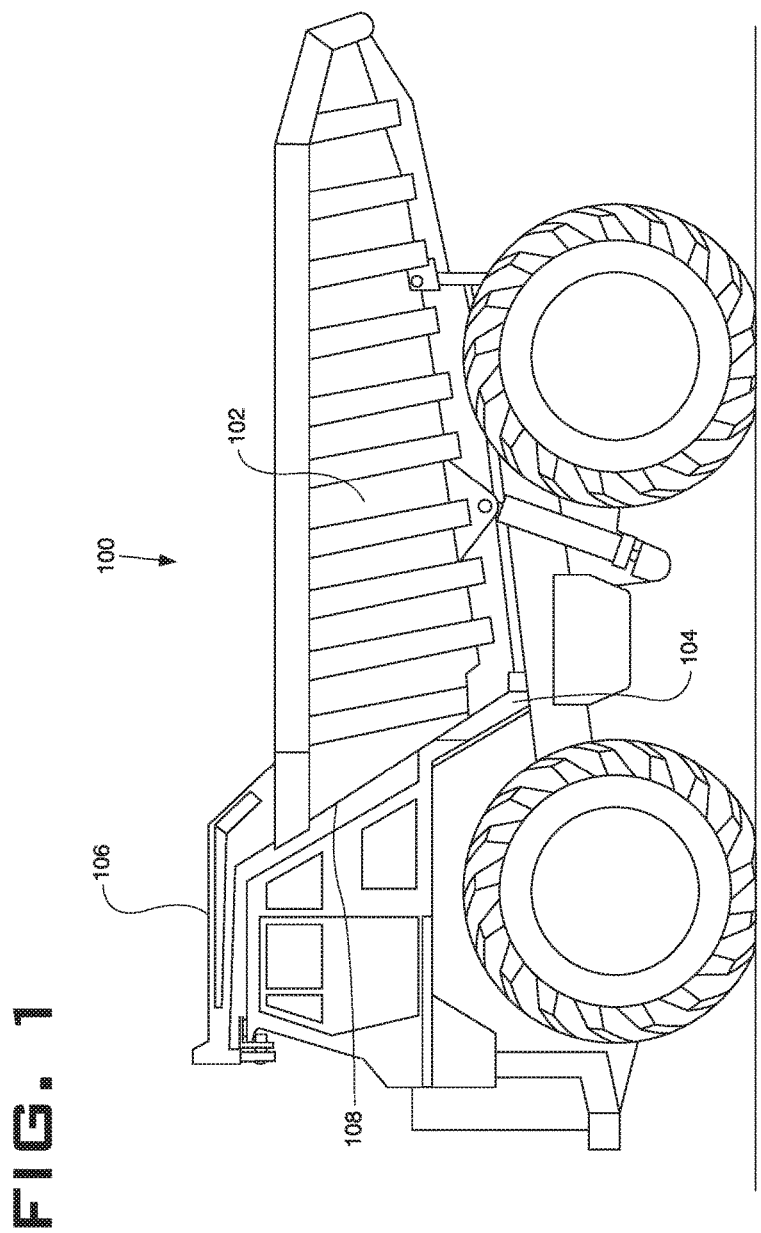
FIG. 1 is a side view of a mining vehicle with a truck body including the disclosed front towers.

Referring to FIG. 1, a mining vehicle 100 has a truck body 102 and a frame 104. The truck body 102 on the mining vehicle 100 is capable of receiving and dumping a load. The truck body 102 has a canopy 106 and a front exterior wall 108. As the truck body 102 receives a load, the truck body 102 is subjected to load stress. Also, when the mining vehicle 100 carries material to its destination, the truck body 102 pivots on the frame 104 to discharge the material from a rearward opening of the truck body 102. The truck body 102 then lowers back into position, causing high forces and stress concentrations on the truck body 102. In addition, non-optimal roads cause oscillations in the truck body 102, thereby also causing stress concentrations on the truck body 102. These stresses can reduce the fatigue life of the truck body 102.

To increase the fatigue life of the truck body 102, a truck body 102 can have front towers 116 on the front exterior wall 108 of the truck body 102. The disclosed light-weight front towers 116 are provided on the truck body 102 to transfer load stress from the truck body to the frame 104. The disclosed front towers 116 are light-weight and are strong enough to withstand the repeated receiving of loads and raising and lowering of the truck body 102.

Figure 2:
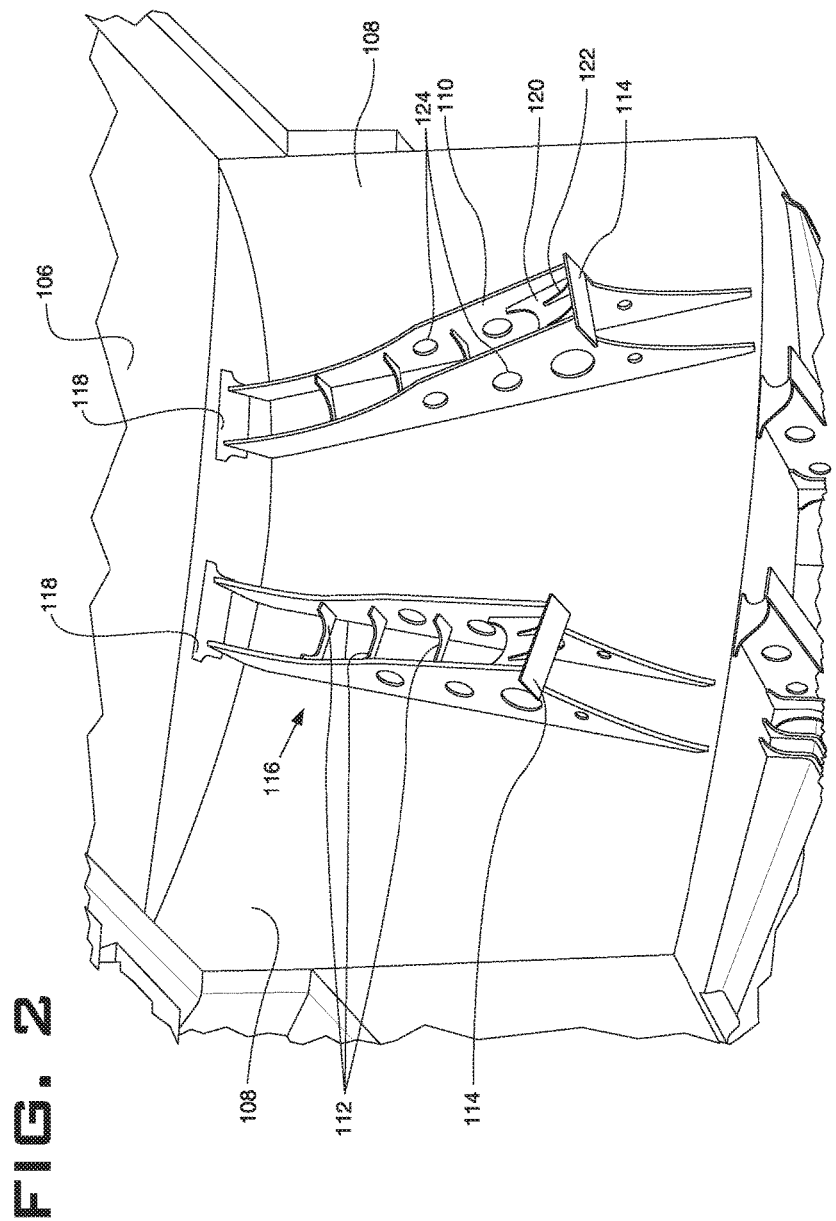
FIG. 2 is an offset front view of the truck body of FIG. 1.

Referring to FIG. 2, a front tower 116 can include two or more longitudinal plates 110. The longitudinal plates 110 span the front exterior wall 108. Gusset plates 112 are transverse and connected between the longitudinal plates 110. The front tower 116 can include one or more gusset plates 112. In one embodiment, the gusset plates 112 can be curved.

The longitudinal plates 110 can be a variety of shapes, for example, the longitudinal plates 110 can be roughly triangular, sword-shaped or curved in certain areas. For example, the upper section of the longitudinal plates 110 can be curved in, as exemplified in FIG. 2. This curvature can reduce the weight of the front towers 116. In addition, this curvature can move the stress concentrations from the weld joints to the outer sections of the longitudinal plates 110 away from the front exterior wall 108.

The front tower 116 also can include landing plates 114. The landing plates 114 transfer the stress from the truck body 102 to the frame 104. For example, as the truck body 102 dumps a load and comes back into the lowered position, the landing plates 114 contact the frame 104 of the mining vehicle 100. In addition, for example, as the truck body 102 receives a load, the landing plates 114 contact the frame 104. This contact between the landing plates 114 and the frame 104 can allow the transfer of the stress from the truck body 102. The landing plates 114 can be connected to the longitudinal plates 110 with landing connecting plates 120. The landing connecting plates 120 can also include support plates 122.

In one embodiment, the front tower 116 can span the front exterior wall 108 from a base of the front exterior wall 108. In another embodiment, the front tower 116 can be connected to the canopy 106. The front tower 116 can be connected to the canopy 106 with canopy connecting plates 118. A canopy 106 can be connected to the front exterior wall 108 in many ways. In one example, the canopy 106 can include an angled plate that connects the canopy 106 to the front exterior wall 108. In another example, the canopy 106 can be flatly connected to the front exterior wall 108.

In one embodiment, the longitudinal plates 110 can include cutouts 124 to reduce the weight of the front tower 116. The cutouts 124 do not reduce the structural integrity of the front towers 116.

Figure 3:
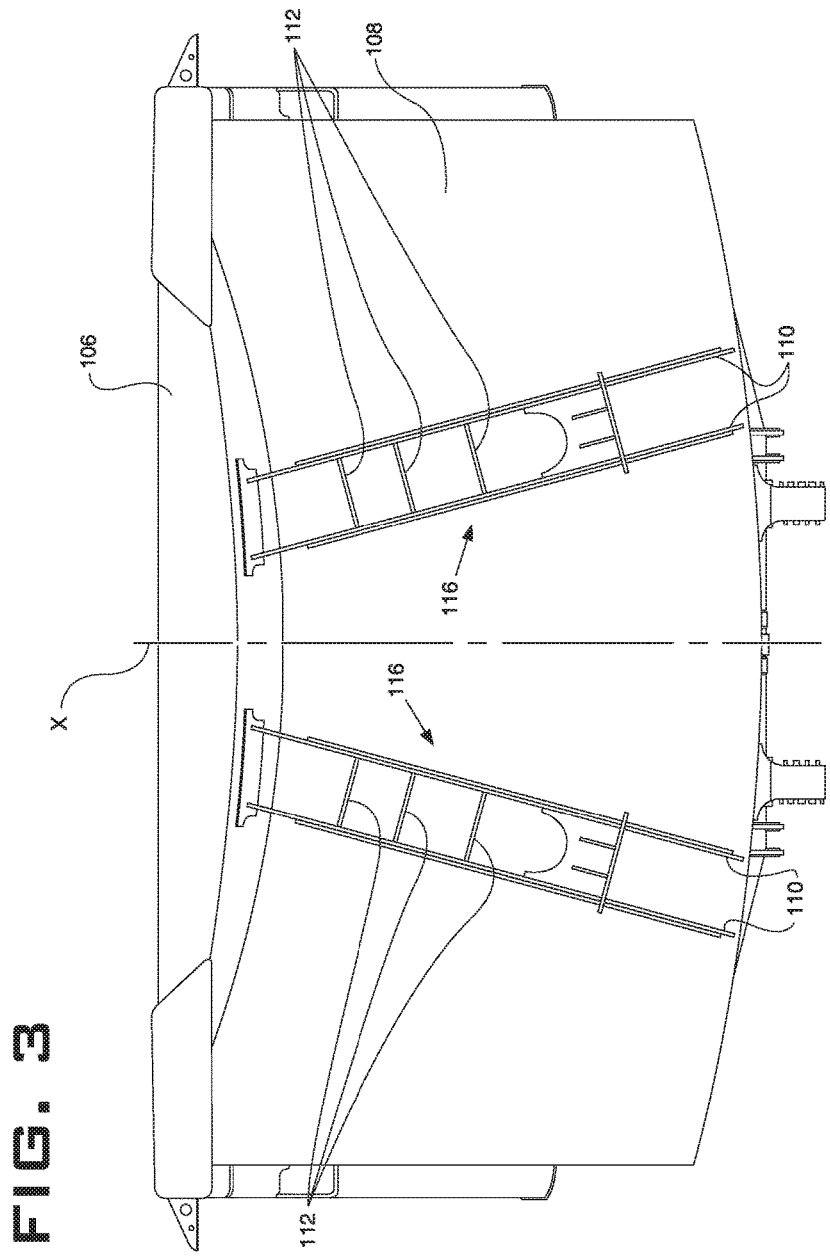
FIG. 3 is a front view of the truck body of FIG. 1.

Referring to FIG. 3, the front exterior wall 108 of the truck body 102 is depicted straight on with a vertical axis "X." In one embodiment, the front towers 116 are offset from the vertical axis "X." The offset can be in a range of about 14 degrees to about 16 degrees from the vertical axis "X." In one embodiment the offset can be about 15 degrees from the vertical axis "X."

In another embodiment, front towers 116 are disclosed that can be attached to the front exterior wall 108 of the truck body 102. The front towers 116 can include two or more longitudinal plates 110 configured to span a front exterior wall 108 of a mining vehicle body, at least one gusset plate 112 transverse and connected to the longitudinal plates 110, and a landing plate 114 transverse and connected to the longitudinal plates 110. The landing plates 114 are configured to transfer load stress from a truck body 102 to a frame 104 of the mining vehicle 100.

The front towers 116 can be made from metal, such as structural steel, or any other structurally sufficient material.

INDUSTRIAL APPLICABILITY

The disclosed front towers 116 may be used in any dump truck application where component longevity and reliability are desired. The disclosed front towers 116 may have improved longevity due to the distribution of the load stress from the truck body 102 and canopy 106 to the frame 104. In addition, the front towers 116 weigh less than traditional front towers 116, thereby the disclosed front towers 116 may increase the longevity of the truck body 102.

It will be apparent to those skilled in the art that carious modification and variations can be made to the disclosed mining truck and front towers. Other embodiments will be apparent to those skilled in the art from consideration of the specification and practice of the disclosed mining truck and front towers. It is intended that the specification and example be considered as exemplary only, with a true scope being indicated by the following claims and their equivalents.

What is claimed is:

1. A truck body for use with a mining vehicle comprising:
   a canopy and a front exterior wall, wherein the front exterior wall comprises a front tower, wherein the front tower comprises:
   two or more longitudinal plates spanning the front exterior wall;
   a gusset plate transverse and connected to the longitudinal plates; and
   a landing plate transverse and connected to the longitudinal plates, wherein the landing plate is configured to transfer load stress from the truck body to a frame of a mining vehicle.

2. The truck body of claim 1, wherein the front tower comprises two or more gusset plates.

3. The truck body of claim 1, wherein the front tower is welded to the front exterior wall.

4. The truck body of claim 1, wherein the front tower is bolted to the front exterior wall.

5. The truck body of claim 1, wherein the front tower is connected to the canopy of the truck body.

6. The truck body of claim 5, wherein the front tower is connected to the canopy of the truck body with canopy connecting plates.

7. The truck body of claim 1, wherein the front tower spans the front exterior wall from a base of the front exterior wall.

8. The truck body of claim 1, wherein the front towers are offset from a vertical axis by about 14 degrees to about 16 degrees.

9. The truck body of claim 1, wherein the landing plate is connected to the longitudinal plates with a landing connecting plate.

10. The truck body of claim 9, wherein the landing connecting plate includes support plates.

11. A front tower for use on a mining vehicle comprising
   two or more longitudinal plates configured to span a front exterior wall of a mining vehicle body;
   a gusset plate transverse and connected to the longitudinal plates; and an landing plate transverse and connected to the longitudinal plates, wherein the landing plate is configured to transfer load stress from a truck body to a chassis of the mining vehicle.

12. The front tower of claim 11, wherein the front tower comprises two or more gusset plates.

13. The front tower of claim 11, wherein the front tower is configured to be connected to a canopy of the truck body.

14. The front tower of claim 13, wherein the front tower is configured to be connected to the canopy of the truck body with canopy connecting plates.

15. The front tower of claim 11, wherein the longitudinal plates are substantially parallel.

16. The front tower of claim 11, wherein the landing plate is connected to the longitudinal plates with a landing connecting plate.

17. The front tower of claim 16, wherein the landing connecting plate includes support plates.

18. A mining truck comprising:
a truck frame;
a truck body comprising a front exterior wall and a canopy;
the front exterior wall comprising a front tower configured to transfer load stress from the truck body to the truck frame;
wherein the front tower comprises:
parallel longitudinal plates spanning the front exterior wall from a base of the truck body to the canopy;
at least one gusset plate transverse to the longitudinal plates; and
a landing plate transverse to the longitudinal plates.

19. The mining truck of claim 18, wherein the front tower comprises two or more gusset plates.

20. The mining truck of claim 18, wherein the front tower is configured to be connected to the canopy of the truck body with canopy connecting plates.

* * * * *